(12) United States Patent
Mohr (10) Patent No.: US 11,505,509 B2
(45) Date of Patent: Nov. 22, 2022

(54) AGRICULTURAL ADDITIVE COMPOSITION FOR IMPROVING SOIL HEALTH AND METHOD OF USE

(71) Applicant: Larry D. Mohr, Tempe, AZ (US)

(72) Inventor: Larry D. Mohr, Tempe, AZ (US)

( * ) Notice: Subject to any disclaimer, the term of this patent is extended or adjusted under 35 U.S.C. 154(b) by 109 days.

(21) Appl. No.: 17/154,815

(22) Filed: Jan. 21, 2021

(65) Prior Publication Data

US 2021/0221751 A1 Jul. 22, 2021

Related U.S. Application Data

(60) Provisional application No. 62/964,140, filed on Jan. 22, 2020.

(51) Int. Cl.

| | | |
|---|---|---|
| *C05F 11/00* | (2006.01) | |
| *A01C 21/00* | (2006.01) | |
| *C05F 5/00* | (2006.01) | |
| *C05G 5/23* | (2020.01) | |
| *C05C 11/00* | (2006.01) | |

(52) U.S. Cl.
CPC .............. *C05F 11/00* (2013.01); *A01C 21/00* (2013.01); *C05C 11/00* (2013.01); *C05F 5/002* (2013.01); *C05G 5/23* (2020.02)

(58) Field of Classification Search
None
See application file for complete search history.

(56) References Cited

U.S. PATENT DOCUMENTS

| | | | | |
|---|---|---|---|---|
| 6,812,022 B1 * | 11/2004 | Aonuma | ................. | C05F 11/08 424/93.46 |
| 8,784,530 B2 * | 7/2014 | Daniels | ................... | C05F 5/002 71/22 |
| 2005/0060930 A1 * | 3/2005 | Kiss | ........................ | C05F 11/08 47/58.1 SC |
| 2017/0166488 A1 * | 6/2017 | Chaudhry | ................ | C05G 3/00 |
| 2018/0290938 A1 * | 10/2018 | Akhund | .................. | C05C 11/00 |
| 2019/0216025 A1 * | 7/2019 | Farmer | ................... | A01G 24/30 |
| 2020/0048156 A1 * | 2/2020 | Yamashita | ............. | A01N 65/00 |

FOREIGN PATENT DOCUMENTS

| | | | | | |
|---|---|---|---|---|---|
| CN | 104522308 A | * | 4/2015 | ............... | A23K 1/14 |
| CN | 106478241 A | * | 3/2017 | ............... | C05G 3/00 |
| CN | 107043289 A | * | 8/2017 | ............... | C05G 3/00 |
| CN | 108651140 A | * | 10/2018 | | |
| CN | 10949992 A | * | 3/2019 | | |
| CN | 109796249 A | * | 5/2019 | ............... | C05G 3/00 |
| CN | 109796287 A | * | 5/2019 | ............... | C05G 3/04 |

* cited by examiner

*Primary Examiner* — Wayne A Langel
(74) *Attorney, Agent, or Firm* — Schmeiser, Olsen & Watts LLP (57) ABSTRACT

An agricultural additive composition is used to improve soil health. The agricultural additive composition improves the % biomass of soil and reduce perchlorates. The agricultural additive composition is used to treat soil and/or irrigation water used for growing plants. The agricultural additive composition includes water, willow bark, nitrogen, citric acid, corn steep and *Yucca* extract.

17 Claims, 4 Drawing Sheets

AGRICULTURAL ADDITIVE COMPOSITION FOR IMPROVING SOIL HEALTH AND METHOD OF USE

CROSS REFERENCE TO RELATED APPLICATION[S]

This claims priority to U.S. Provisional Patent Application Ser. No. 62/964,140, filed Jan. 22, 2020, the disclosures of which is hereby incorporated entirely herein by reference.

BACKGROUND OF THE INVENTION

Technical Field

This invention relates to an agricultural additive composition, particularly to a composition used to treat soil and/or irrigation water used for growing plants.

State of the Art

Irrigation water containing excessive levels of sodium, carbonate, and bicarbonate ions can pose major problems for farmers, ranchers, turfgrass managers, and crop managers. Calcium plays a key role in soil structure. Calcium and other polyvalent cations such as magnesium, are strongly attracted to negative sites on soil surfaces, where they form ion bridges that hold soil particles together, restrict swelling, and prevent dispersion. Thus, calcium, magnesium, and similar polyvalent cations are a contributor to positive soil quality. However, carbonates and bicarbonates in water have a high affinity for calcium and magnesium. This chemical attraction results in the formation of insoluble salts and prevents calcium from being available to the soil and the plants. The buildup of insoluble salts in water and soil contributes to decreased soil aeration, soil percolation, and soil drainage; and negatively affects crops grown in the soil.

Salt remediation (a soil stressor), improving biomass and soil organic matter play a key role in developing soil and plant health. Accordingly, what is needed is a composition that can reduce salt buildup in soil and improve soil health.

DISCLOSURE OF THE INVENTION

The disclosed invention relates to agricultural additive compositions for soil, specifically to an agricultural additive composition used to treat soil and/or irrigation water used for growing plants.

Disclosed is an agricultural additive composition comprising water, willow bark, a nitrogen source, citric acid, corn steep and a *Yucca* extract. The agricultural additive composition is used to control and manage conditions in irrigation water and soil to prevent and treat sodic deterioration of soil structure and improve biomass. Treatment of soil and/or irrigation water leads to improved growth and quality of plants grown in the soil treated with the agricultural additive composition. The agricultural additive composition may be a liquid. In some embodiments, the agricultural additive composition is applied directly to the soil. In some embodiments, the agricultural additive composition is added to irrigation water which irrigates the soil.

Disclosed is a method of promoting plant growth, conditioning soil, fertilizing plants, or conditioning irrigation water, where the method comprises mixing an agricultural additive composition with water, and applying the mixture of agricultural additive composition and water to soil, wherein at least one plant is planted in the soil. In some embodiments, the method includes adding a source of calcium to the soil.

Disclosed is a method of conditioning soil used to grow plants, promoting plant growth, or fertilizing plants, where the method comprises applying an agricultural additive composition to soil, where the soil is used to grow plants; and applying water to the soil. In some embodiments, the method includes adding a source of calcium to the soil.

The foregoing and other features and advantages of the invention will be apparent to those of ordinary skill in the art from the following more particular description of the invention and the accompanying drawings.

DETAILED DESCRIPTION OF EMBODIMENTS OF THE INVENTION

The disclosed invention relates to soil and water treatment compositions, specifically to an agricultural additive composition used to treat soil and/or irrigation water. The soil can be used for growing plants, for example. The disclosed agricultural additive composition is used to control and manage conditions in irrigation water and soil for salt management and increase biomass to prevent sodic deterioration of soil structure. Treatment of soil and/or irrigation water with the agricultural additive composition leads to improved growth and quality of plants grown in the soil treated with the agricultural additive composition. The agricultural additive composition reacts with calcium carbonates and bicarbonates in water and soil, releasing calcium ions, which are now free to replace sodium on soil particle exchange sites. Releasing calcium ions so they are available to replace sodium on soil particle exchange sites is an important step in reclaiming sodic soils.

Irrigation water containing excessive levels of sodium, carbonate, and bicarbonate ions can pose major problems for farmers, ranchers, turfgrass managers, and crop managers. Calcium plays a key positive role in soil structure. Calcium and other polyvalent cations such as magnesium, are strongly attracted to negative sites on soil surfaces, where they form ion bridges that hold soil particles together, restrict swelling, and prevent soil dispersion. Calcium also contributes positively to plant growth and health. Thus, calcium, magnesium, and similar polyvalent cations are a contributor to positive soil quality and plant growth.

Unfortunately, high carbonate ($CO_3=$) and bicarbonate ($HCO_3-$) levels in water decrease the availability of calcium and magnesium in the soil solution. Both carbonate and bicarbonate, with their negative charges, are strongly attracted to the positive charges of calcium and magnesium and form insoluble precipitates of calcium carbonate ($CaCO_3$) and magnesium carbonate ($MgCO_3$) when the soil solution concentrates during soil drying. This chemical attraction results in the formation of insoluble salts and prevents calcium from being available to the soil and the plants. In addition, when the carbonate and bicarbonate strip calcium from soil sites, the open soil sites attract sodium cations. When the sodium cations occupy the soil sites, this causes dispersion of soil particles, the breakdown of soil aggregates, and causes the soil to become hard and compact when dry. This "sodic" soil will become increasingly impervious to water penetration and inhibit water percolation. The buildup of insoluble salts in water and soil contributes to decreased soil aeration, decreased soil percolation, decreased soil drainage, and negatively affects crops grown in the soil. Soil scientists recognize that prevention and reclamation of sodic soils can be initiated with increased biomass of the soil.

The disclosed agricultural additive composition is used to control and manage conditions in irrigation water and/or soil to prevent sodic deterioration of soil structure. The disclosed agricultural additive composition increases the amount of free calcium ions in the soil that can bind with soil sites and prevent or reclaim sodic soil. Treatment of soil and/or irrigation water with the agricultural additive composition leads to increased levels of free calcium ions than can be bonded with soil sites and absorbed by plant roots and can contribute to plant growth and health.

The agricultural additive composition reduces salt from the soil colloid when activated by irrigation or rain. By reducing the salt as a stresser and replacing it with a calcium ion the soil begins to expand increasing the water and air space in the soil profile. This improvement to the soil environment begins the process of improved soil heath. The agricultural additive composition improves the soil environment supporting the increase of microbiome activity. The agricultural additive composition supports the improvement of total biomass and total bacterial biomass upward to about 50%.

Water, willow bark, a nitrogen source, citric acid, corn steep and a *Yucca* extract are blended to form the agricultural additive composition. Generally, willow bark is added to the water and blended followed by a nitrogen source, citric acid, corn step and a *Yucca* extract in that order of addition. Generally, the amount of water is in the range of from about 60% to about 70% by weight of the total composition.

Willow bark is the bark from several varieties of the willow tree, including white willow or European willow, black willow or pussy willow, crack willow, purple willow, and others. Suitable sources of willow bark include, but are not limited to white willow bark, such as Star West Botanicals willow bark. Generally, the amount of willow bark is in the range of from about 0.1 to about 0.4% by weight of the total composition.

Willow bark comprises salicin. For example, about 1 to about 3 grams of white willow Bark powder corresponds to an amount in the range of from about 60 to about 120 mg of salicin in solution.

Suitable nitrogen sources include, but are not limited to, an organic nitrogen source, such as Growers Secret Nitrogen 14-0-0™. Generally, the organic nitrogen source is an amount in the range of from about 12 to about 18% by weight of the total composition.

Suitable sources of citric acid include, but are not limited to, organic citric acid. Generally, the citric acid is an amount in the range of from about 15 to about 20% by weight of the total composition.

Corn steep liquor is a by-product of corn wet milling. Corn steep is a viscous concentrate of corn solubles which contains amino acids, vitamins and minerals. Suitable sources of corn steep include, but are not limited to, Growers Secret corn steep. Generally, the corn steep is in an amount in the range of from about 0.5 to about 2% by weight of the total composition.

Suitable sources of *Yucca* extract include, but are not limited to, *Yucca schidigera* extract. Generally, the *Yucca* extract is in an amount on the range of from about 0.5 to about 2% by weight of the total composition.

The agricultural additive composition can be applied to soil in many different ways. Agricultural additive composition 110 may be applied once, or more than once, for example 6 times. The agricultural additive composition is applied to soil in an agricultural additive composition/soil ratio in the range of from about 32 ounces to about 60 ounces/per acre per month.

Figure 1:
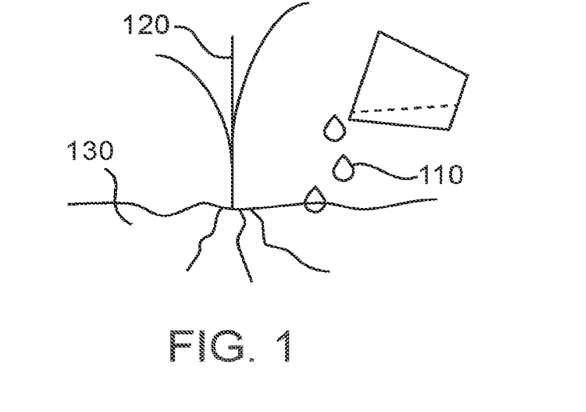
FIG. 1 shows a solution of agricultural additive composition and water being added to soil being used to grow a plant.

In some embodiments, the agricultural additive composition is mixed with irrigation water that is applied to soil, as shown in FIG. 1. FIG. 1 shows an agricultural additive composition 110 being applied to soil 130. A plant 120 is growing in soil 130. Agricultural additive composition 110 in this embodiment is mixed with water. Agricultural additive composition 110 can be mixed with water in many different ways. Agricultural additive composition 110 can also be injected into irrigation water, for example.

Figure 2:
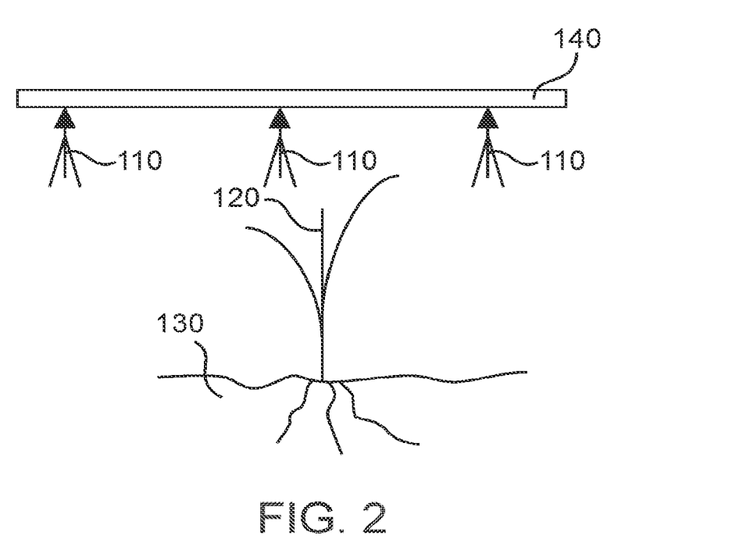
FIG. 2 shows a solution of agricultural additive composition and water being sprayed on soil being used to grow a plant.

In some embodiments, agricultural additive composition 110 is applied by a boom spray to soil, as shown in FIG. 2. FIG. 2 shows agricultural additive composition 110 being applied to soil 130 via a boom sprayer 140. In this embodiment, water can be added to soil 130 with agricultural additive composition 110 or separately as irrigation water, or both.

Figure 3:
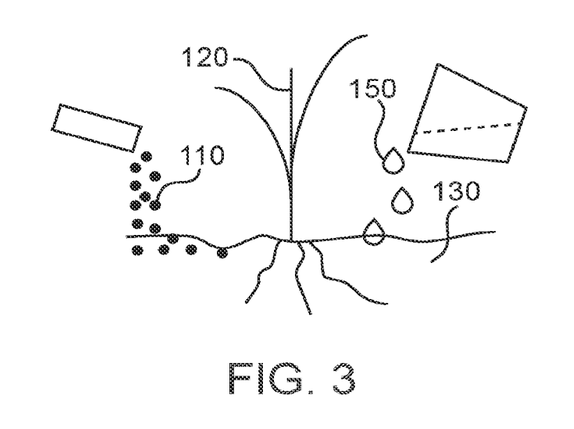
FIG. 3 shows a solid agricultural additive composition being mixed with soil, with water also being added to the soil. The soil is being used to grow a plant.

In some embodiments, the agricultural additive composition is applied to soil, either before, or concurrently with, water being applied to the soil, as shown in FIG. 3. FIG. 3 shows agricultural additive composition 110 being applied to soil 130, with additional water 150 being applied separately.

When the agricultural additive composition is present with a mixture of soil and water, the agricultural additive composition reacts with carbonates and bicarbonates in the water, forming harmless water and carbon dioxide, and leaving the calcium and magnesium in solution. The agricultural additive composition also increases the solubility of gypsum or lime ($CaSO3$) in water and increases their availability to plants and soil. When added to irrigation water, the agricultural additive composition solubilizes calcium carbonates and calcium bicarbonate in the water and in the soil. The agricultural additive composition reacts with the calcium carbonates and bicarbonates, releasing calcium ions, water, and carbon dioxide. The calcium ions are now free to replace sodium on the soil particle exchange sites along with other positively charged plant nutrients.

The agricultural additive composition can be used alone, or in conjunction with a calcium source such as, for example but not by way of limitation, gypsum or lime or beet lime, a waste by product from sugar production from sugar beets.

Figure 4:
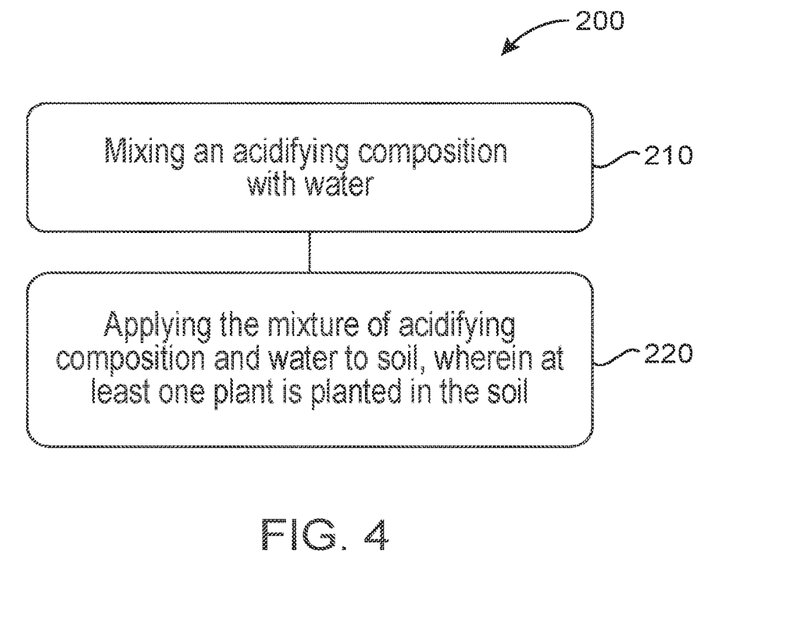
FIG. 4 illustrates a method of promoting plant growth, conditioning soil, fertilizing plants, or conditioning irrigation water.

FIG. 4 illustrates a method 200 of promoting plant growth, conditioning soil, fertilizing plants, or conditioning irrigation water, where method 200 comprises step 210 of mixing an agricultural additive composition with water, and step 220 of applying the mixture of agricultural additive composition and water to soil, wherein at least one plant is planted in the soil. Method 200 can include many other steps.

Figure 5:
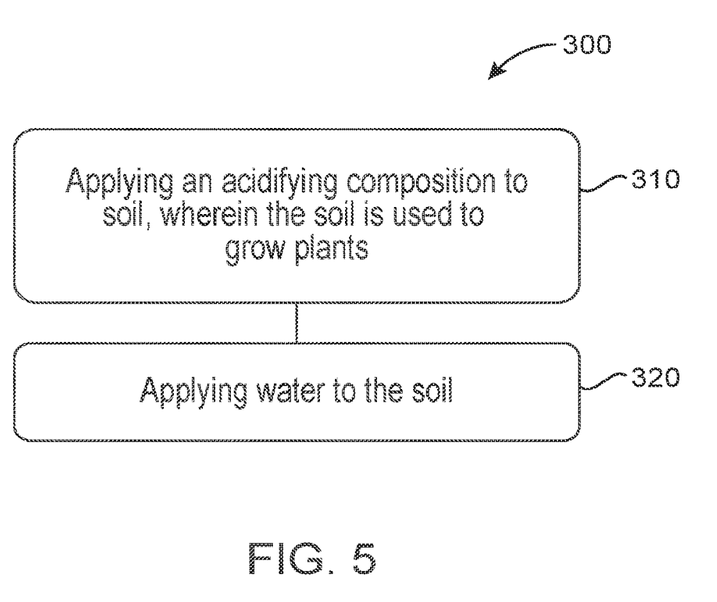
FIG. 5 illustrates a method of conditioning soil used to grow plants, promoting plant growth, or fertilizing plants.

FIG. 5 illustrates a method 300 of conditioning soil used to grow plants, promoting plant growth, or fertilizing plants, where the method comprises step 310 of applying an agricultural additive composition to soil, where the soil is used to grow plants; and step 320 of applying water to the soil. Method 300 can include many other steps.

The following examples are descriptive and not meant to be limiting.

Example 1

Water was added to a clean blending tank followed by willow bark, Growers Secret Nitrogen™, citric acid, corn steep and a *Yucca* extract in order in the amounts listed below in Table 1 below and blended.

TABLE 1

| | Weight % of Batch | Quantity lbs. | Grams |
|---|---|---|---|
| Water | 64.8930 | 5.6295 | 2,553.47 |
| Willow Bark | 0.2100 | 0.0182 | 8.26 |
| Growers Secret Nitrogen 14-0-0 ™ | 14.6750 | 1.2731 | 577.45 |
| Citric Acid | 18.2350 | 1.5819 | 717.53 |
| Corn Steep | 1.0110 | 0.0877 | 39.78 |
| Yucca extract | 1.0110 | 0.0877 | 39.78 |
| Total | 100.0350 | 8.678 | 3936.270 |

The finished agricultural additive composition has the following properties:
  Batch size 275 gallons
  pH 4.0-5.0
  Specific gravity 1.039
  Weight per Gallon 8.675 lbs./gallon
  Grams/lbs. 453.59

Example 2

A soil health study was conducted using the agricultural additive composition made in accordance with Example 1 to measure soil health. Two fields, Turner field in Oregon and Reapers field in Washington, were tested. Each field was approximately 160 acres and divided into 8 equal pie shaped plots of approximately 20 acres. One plot was designated treated and another plot designated untreated. The remaining six plots were not tested.

Two quarts of the composition made in accordance with Example 1 was applied to both the Turner field and the Reaper field treated plot in May 2017 followed by applications of one quart on each of the treated plots in June 2017, August 2017, May 2018 and June 2018 for a total application of 6 quarts over a 2-year period.

Soil samples were taken from the Turner field treated and untreated plots on Jul. 26, 2017 and Sep. 20, 2017. Soil samples were taken from the Reaper field treated and untreated plots on Jul. 26, 2017 and Oct. 19, 2017. Soil samples from the treated and untreated plots of both fields were also taken on Apr. 19, 2018 and Sep. 21, 2018.

The soil health testing procedure measured the Phospholipid Fatty Acids being given off by each microbial population being measured. These results were reported in indexes, levels and percentage as shown in Tables 2-5.

The total biomass of microbial population measured on all samples and the treated samples showed a marked improvement in total biomass over the corresponding untreated sample. These increases ranged from 200 to 1800 on the total biomass scale. The diversity index ranged on all samples from 1.013 up to 1.644 with most treated samples being higher. There was also an increase in the total bacterial biomass in most treated samples versus corresponding untreated samples. This included increases in Gram positive and negative bacteria as well as Actinomycetes. The greatest increase in bacterial biomass occurred in the Sep. 20, 2017 and Oct. 19, 2017 samples following the second application of the additive composition and continued into the 2018 samples as well. It is believed that as soil health and flocculation increased with continued application of the additive composition, the food source and activity of all bacterial populations present in the soil increased.

*Rhizobia* increased in the Turners treated samples. The total fungi biomass was higher in all treated versus untreated samples. The total fungi biomass increase ranged from 65 to 229. Arbuscular Mycorrhizal and Saprophytic also showed increases in the treated samples over the untreated samples. Saprophytic biomass increased the greatest of the two measured fungi. Due to the increase in fungi and bacterial populations in treated samples, most showed a marked increase over untreated samples in the fungi to bacterial ratios.

Tables 2-5 show an increasing soil health as both the bacterial, protozoan and fungi populations as increasing. With the protozoan increase in most treated samples the predator to prey ratio also showed increase over the untreated samples. These increases allow good predator populations to feed on unhealthy bacterial and fungal populations. With the increase in gram negative bacteria in each treated sample, the ratios of the gram positive to gram negative go down in most samples. This shows the growth in gram negative bacteria which allows for greatest increase in the soil health.

TABLE 2

| Date | Field | Sample | Total Biomass | Diversity Index | Bacteria % | Total Bacteria Biomass | Actinomycetes % | Actinomycetes Biomass | Gram (−) % |
|---|---|---|---|---|---|---|---|---|---|
| Jul. 26, 2017 | Turner | TREATED | 2678.92 | 1.461 | 33.61 | 900.48 | 4.09 | 109.61 | 19.5 |
| Sep. 20, 2017 | Turner | TREATED | 2745.08 | 1.644 | 53.8 | 1476.85 | 8.78 | 241.09 | 27.77 |
| Apr. 19, 2018 | Turner | TREATED | 4092.09 | 1.566 | 53.3 | 2180.99 | 9.42 | 385.53 | 26.14 |
| Sep. 21, 2018 | Turner | TREATED | 3193.19 | 1.559 | 48.98 | 1564.16 | 8.51 | 271.63 | 21.43 |
| Jul. 26, 2017 | Turner | UNTREATED | 842.32 | 1.338 | 32.04 | 269.92 | 4.48 | 37.72 | 13.54 |
| Sep. 20, 2017 | Turner | UNTREATED | 1912.45 | 1.55 | 52.02 | 994.82 | 8.32 | 159.05 | 23.33 |
| Apr. 19, 2018 | Turner | UNTREATED | 2163.64 | 1.572 | 50.06 | 1083.18 | 9.39 | 203.21 | 23.91 |
| Sep. 21, 2018 | Turner | UNTREATED | 2534.34 | 1.464 | 48.4 | 1226.62 | 7.41 | 187.7 | 22.25 |
| Jul. 26, 2017 | TR Reapers | TREATED | 2340.45 | 1.47 | 35.19 | 823.51 | 4.33 | 101.25 | 17.9 |
| Oct. 19, 2017 | TR Reapers | TREATED | 3412.77 | 1.311 | 47.14 | 1698.95 | 8.36 | 285.3 | 17.72 |
| Apr. 19, 2018 | TR Reapers | TREATED | 3219.65 | 1.414 | 47.52 | 1529.86 | 7.47 | 240.63 | 21.35 |
| Sep. 21, 2018 | TR Reapers | TREATED | 3352.9 | 1.512 | 45.6 | 1529.03 | 7.47 | 250.5 | 19.96 |
| Jul. 26, 2017 | TR Reapers | UNTREATED | 535.82 | 1.197 | 36.86 | 197.48 | 6.21 | 33.3 | 12.24 |

TABLE 2-continued

| Date | Field | Sample | Total Biomass | Diversity Index | Bacteria % | Total Bacteria Biomass | Actinomycetes % | Actinomycetes Biomass | Gram (−) % |
|---|---|---|---|---|---|---|---|---|---|
| Oct. 19, 2017 | TR Reapers | UNTREATED | 3203.7 | 1.312 | 46.32 | 1484.07 | 8.16 | 261.56 | 18.55 |
| Apr. 19, 2018 | TR Reapers | UNTREATED | 2319.55 | 1.441 | 50.16 | 1163.49 | 8.14 | 188.76 | 24.13 |
| Sep. 21, 2018 | TR Reapers | UNTREATED | 2982.02 | 1.634 | 47.44 | 1414.73 | 8.25 | 245.95 | 22.26 |

TABLE 3

| Date | Field | Sample | Gram (−) Biomass | Rhizobia % | Rhizobia Biomass | Total Fungi % | Total Fungi Biomass | Arbuscular Mycorrhizal % | Arbuscular Mycorrhizal Biomass |
|---|---|---|---|---|---|---|---|---|---|
| Jul. 26, 2017 | Turner | TREATED | 522.38 | 0.81 | 21.57 | 9.25 | 247.73 | 1.52 | 40.78 |
| Sep. 20, 2017 | Turner | TREATED | 762.32 | 2.74 | 75.26 | 15.16 | 416.08 | 4.86 | 133.38 |
| Apr. 19, 2018 | Turner | TREATED | 1069.76 | 1.32 | 54.03 | 12.23 | 500.39 | 4.44 | 181.67 |
| Sep. 21, 2018 | Turner | TREATED | 684.19 | 0.75 | 23.85 | 11.36 | 362.78 | 4.11 | 131.2 |
| Jul. 26, 2017 | Turner | UNTREATED | 114.08 | 0 | 0 | 5.33 | 44.91 | 1.05 | 8.83 |
| Sep. 20, 2017 | Turner | UNTREATED | 446.24 | 1.03 | 19.69 | 12.63 | 241.59 | 4.23 | 80.92 |
| Apr. 19, 2018 | Turner | UNTREATED | 517.41 | 0.92 | 20 | 13.02 | 281.79 | 4.01 | 86.72 |
| Sep. 21, 2018 | Turner | UNTREATED | 563.8 | 0 | 0 | 10.91 | 276.45 | 3.65 | 92.53 |
| Jul. 26, 2017 | TR Reapers | TREATED | 418.91 | 0 | 0 | 10.44 | 244.38 | 2.48 | 58.03 |
| Oct. 19, 2017 | TR Reapers | TREATED | 604.6 | 0 | 0 | 6.55 | 223.56 | 0 | 0 |
| Apr. 19, 2018 | TR Reapers | TREATED | 687.5 | 0 | 0 | 8.34 | 268.4 | 3.26 | 104.85 |
| Sep. 21, 2018 | TR Reapers | TREATED | 669.29 | 0.34 | 11.28 | 11.21 | 375.91 | 2.8 | 93.76 |
| Jul. 26, 2017 | TR Reapers | UNTREATED | 65.6 | 0 | 0 | 2.81 | 15.06 | 0 | 0 |
| Oct. 19, 2017 | TR Reapers | UNTREATED | 594.28 | 0 | 0 | 5.67 | 178.51 | 0.32 | 10.36 |
| Apr. 19, 2018 | TR Reapers | UNTREATED | 559.74 | 0 | 0 | 11.1 | 257.49 | 2.58 | 59.96 |
| Sep. 21, 2018 | TR Reapers | UNTREATED | 663.82 | 1.57 | 46.69 | 14.76 | 440.11 | 4.02 | 119.84 |

TABLE 4

| Date | Field | Sample | Saprophytic % | Saprophytes Biomass | Protozoan % | Protozoa Biomass | Gram (+) Biomass | Gram (+) % | Undifferentiated % |
|---|---|---|---|---|---|---|---|---|---|
| Jul. 26, 2017 | Turner | TREATED | 7.73 | 206.95 | 0.32 | 8.47 | 378.09 | 14.11 | 56.82 |
| Sep. 20, 2017 | Turner | TREATED | 10.3 | 282.7 | 1.44 | 39.59 | 714.53 | 26.03 | 29.6 |
| Apr. 19, 2018 | Turner | TREATED | 7.79 | 318.71 | 0.9 | 36.66 | 1111.23 | 27.16 | 33.58 |
| Sep. 21, 2018 | Turner | TREATED | 7.25 | 231.58 | 1.02 | 32.59 | 879.96 | 27.56 | 38.63 |
| Jul. 26, 2017 | Turner | UNTREATED | 4.28 | 36.08 | 0 | 0 | 155.84 | 18.5 | 62.62 |
| Sep. 20, 2017 | Turner | UNTREATED | 8.4 | 160.67 | 0.76 | 14.52 | 548.58 | 28.68 | 34.59 |
| Apr. 19, 2018 | Turner | UNTREATED | 9.02 | 195.06 | 0.91 | 19.76 | 565.78 | 26.15 | 36 |
| Sep. 21, 2018 | Turner | UNTREATED | 7.26 | 183.92 | 0.64 | 16.29 | 662.82 | 26.15 | 40.05 |
| Jul. 26, 2017 | TR Reapers | TREATED | 7.96 | 186.35 | 0.73 | 17.08 | 404.6 | 17.29 | 53.64 |
| Oct. 19, 2017 | TR Reapers | TREATED | 6.55 | 223.56 | 0.37 | 12.49 | 1004.34 | 29.43 | 45.94 |
| Apr. 19, 2018 | TR Reapers | TREATED | 5.08 | 163.56 | 0.32 | 10.3 | 842.36 | 26.16 | 43.83 |
| Sep. 21, 2018 | TR Reapers | TREATED | 8.42 | 282.15 | 0.78 | 26.22 | 859.74 | 25.64 | 42.4 |
| Jul. 26, 2017 | TR Reapers | UNTREATED | 2.81 | 15.06 | 0 | 0 | 131.88 | 24.61 | 60.33 |
| Oct. 19, 2017 | TR Reapers | UNTREATED | 5.25 | 168.14 | 0.23 | 7.37 | 889.78 | 27.77 | 47.87 |
| Apr. 19, 2018 | TR Reapers | UNTREATED | 8.52 | 197.53 | 0.56 | 12.99 | 603.75 | 26.03 | 38.18 |
| Sep. 21, 2018 | TR Reapers | UNTREATED | 10.74 | 320.28 | 1.43 | 42.67 | 750.91 | 25.18 | 36.37 |

TABLE 5

| Date | Field | Sample | Undifferentiated Biomass | Fungi:Bacteria | Predator:Prey |
|---|---|---|---|---|---|
| Jul. 26, 2017 | Turner | TREATED | 1522.24 | 0.2751 | 0.0094 |
| Sep. 20, 2017 | Turner | TREATED | 812.56 | 0.2817 | 0.0268 |
| Apr. 19, 2018 | Turner | TREATED | 1374.07 | 0.2294 | 0.0168 |
| Sep. 21, 2018 | Turner | TREATED | 1233.67 | 0.2319 | 0.0208 |
| Jul. 26, 2017 | Turner | UNTREATED | 527.49 | 0.1664 | ALL PREY |
| Sep. 20, 2017 | Turner | UNTREATED | 661.53 | 0.2428 | 0.0146 |
| Apr. 19, 2018 | Turner | UNTREATED | 778.91 | 0.2601 | 0.0182 |
| Sep. 21, 2018 | Turner | UNTREATED | 1014.99 | 0.2254 | 0.0133 |
| Jul. 26, 2017 | TR Reapers | TREATED | 1255.49 | 0.2968 | 0.0207 |
| Oct. 19, 2017 | TR Reapers | TREATED | 1567.78 | 0.1389 | 0.0078 |

TABLE 5-continued

| Apr. 19, 2018 | TR Reapers | TREATED | 1411.08 | 0.1754 | 0.0067 |
| Sep. 21, 2018 | TR Reapers | TREATED | 1421.75 | 0.2458 | 0.0171 |
| Jul. 26, 2017 | TR Reapers | UNTREATED | 323.28 | 0.0763 | ALL PREY |
| Oct. 19, 2017 | TR Reapers | UNTREATED | 1533.76 | 0.1203 | 0.005 |
| Apr. 19, 2018 | TR Reapers | UNTREATED | 885.57 | 0.2213 | 0.0112 |
| Sep. 21, 2018 | TR Reapers | UNTREATED | 1084.52 | 0.3111 | 0.0302 |

| Date | Gram(+):Gram(−) | Sat:Unsat | Monopoly | Pre 16:1w7c:cy17:0 | Pre 18:1w7c:cy19:0 |
| --- | --- | --- | --- | --- | --- |
| Jul. 26, 2017 | 0.7238 | 2.2733 | 7.6102 | 6.9046 | 15.7772 |
| Sep. 20, 2017 | 0.9373 | 1.2836 | 6.7523 | 3.5368 | 4.4419 |
| Apr. 19, 2018 | 1.0388 | 1.4066 | 10.1755 | 7.0109 | 9.0011 |
| Sep. 21, 2018 | 1.2861 | 1.6254 | 9.5231 | ALL PRE 16:1 | 15.0247 |
| Jul. 26, 2017 | 1.3661 | 3.4689 | 18.5973 | NONE FOUND | ALL PRE 18:1 |
| Sep. 20, 2017 | 1.2293 | 1.4576 | 9.3902 | 7.878 | 11.0197 |
| Apr. 19, 2018 | 1.0935 | 1.4744 | 9.6143 | 7.8987 | 13.6612 |
| Sep. 21, 2018 | 1.1756 | 1.6217 | 10.8045 | ALL PRE 16:1 | ALL PRE 18:1 |
| Jul. 26, 2017 | 0.9658 | 2.0313 | 4.8733 | ALL PRE 16:1 | ALL PRE 18:1 |
| Oct. 19, 2017 | 1.6612 | 2.2374 | 12.6 | NONE FOUND | 73.5642 |
| Apr. 19, 2018 | 1.2253 | 1.8545 | 18.9163 | ALL PRE 16:1 | ALL PRE 18:1 |
| Sep. 21, 2018 | 1.2846 | 1.6632 | 7.1729 | ALL PRE 16:1 | 17.5363 |
| Jul. 26, 2017 | 2.0104 | 5.1454 | ALL MONO | NONE FOUND | ALL PRE 18:1 |
| Oct. 19, 2017 | 1.4972 | 2.2141 | 12.2512 | NONE FOUND | 88.7633 |
| Apr. 19, 2018 | 1.0786 | 1.4351 | 10.9784 | ALL PRE 16:1 | ALL PRE 18:1 |
| Sep. 21, 2018 | 1.1312 | 1.4927 | 5.5356 | 5.6198 | 7.4976 |

Example 3

Mint plants were grown on the treated and untreated plots of Example 2. Tea leaves from the mint plants grown on the Turner field were sampled in August 2017 and tea leaves grown on the TR Reaper field were sampled in September 2017 2017 for perchlorates in the leaf tissue. Perchlorates are absorbed from the soil and stored in the leaf tissue. An increase in soil health corresponds to a reduction of perchlorates and therefore perchloric acid as shown in Table 6. The increase in gram negative bacteria from the treated samples allows for the greatest breakdown of perchloric acid.

TABLE 6

| Date | Field | Perchlorate PPM Units |
| --- | --- | --- |
| Aug. 19, 2017 | Turner untreated | 0.39 |
| Aug. 31, 2017 | Turner treated | 0.37 |
| Sep. 5, 2017 | TR Reapers untreated | 0.28 |
| Sep. 5, 2017 | TR Reapers treated | 0.24 |

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. An agricultural additive composition for treating soil and/or irrigation water, comprising:
   water in an amount of 60 to 70% by weight,
   willow bark in an amount of 0.1 to 0.4% by weight,
   a nitrogen source in an amount of 12-18% by weight,
   citric acid in an amount of 15-20% by weight,
   corn steep in an amount of 0.5 to 2% by weight, and
   a *Yucca* extract in an amount of 0.5 to 2% by weight.

2. The agricultural additive composition of claim 1, wherein the willow bark comprises salicin.

3. The agricultural additive composition of claim 1, wherein the water is in an amount of about 64.9% by weight.

4. The agricultural additive composition of claim 1, wherein the willow bark is in an amount of about 0.2% by weight.

5. The agricultural additive composition of claim 1, wherein the nitrogen source is in an amount of about 14.7% by weight.

6. The agricultural additive composition of claim 1, wherein the citric acid is an amount of about 18.2% by weight.

7. The agricultural additive composition of claim 1, wherein the *Yucca* extract is in an amount of about 1.0% by weight.

8. A method of forming an agricultural additive composition for treating soil and/or irrigation water, comprising:
   mixing water and willow bark;
   adding a source of nitrogen to the mixture of the water and the willow bark;
   adding citric acid to the mixture of the water, the willow bark and the nitrogen source;
   adding corn steep to the mixture of the water, the willow bark, the nitrogen source and the citric acid; and
   adding a *Yucca* extract to the mixture the water, the willow bark, the nitrogen source, the citric acid and the corn steep,
   wherein the resulting agricultural additive composition has 60 to 70% by weight of water, 0.1 to 0.4% by weight of willow bark, 12-18% by weight of the nitrogen source, 15-20% by weight of the citric acid, 0.5 to 2% by weight of the corn steep, and 0.5 to 2% by weight of the *Yucca* extract.

9. A method for improving soil health comprising applying an agricultural additive composition to the soil, wherein the agricultural additive composition comprises 60-70% water, 0.1 to 0.4% willow bark, 12-18% nitrogen, 15-20% citric acid, 0.5 to 2% corn steep, and 0.5 to 2% *Yucca* extract.

10. The method of claim 9, wherein the soil has an increase in % biomass of about 50% after the application of the agricultural additive composition.

11. The method of claim 9, wherein the willow bark comprises salicin.

12. The method of claim 9, wherein the water is in an amount of about 64.9% by weight.

13. The method of claim 9, wherein the willow bark is in an amount of about 0.2% by weight.

14. The method of claim 9, wherein nitrogen is in an amount of about 14.7%.

15. The method of claim 9, wherein the citric acid is an amount of about 18.2% by weight.

16. The method of claim 9, wherein *Yucca* extract is in an amount of about 1.0% by weight.

17. The method of claim 9, wherein the agricultural additive composition is added to irrigation water applied to the soil.

\* \* \* \* \*